US010751725B2

(12) United States Patent
Weller et al.

(10) Patent No.: US 10,751,725 B2
(45) Date of Patent: Aug. 25, 2020

(54) DRIVING ARRANGEMENT FOR A HEAVY-DUTY GRINDING MILL AND HEAVY-DUTY GRINDING MILL

(71) Applicant: FLSmidth A/S, Valby (DK)

(72) Inventors: Peter Weller, Wangen (CH); Eduardo Hurtado, Sandy, UT (US)

(73) Assignee: FLSmidth A/S (DK)

( * ) Notice: Subject to any disclaimer, the term of this patent is extended or adjusted under 35 U.S.C. 154(b) by 0 days.

(21) Appl. No.: 16/469,720

(22) PCT Filed: Dec. 14, 2017

(86) PCT No.: PCT/IB2017/057945
§ 371 (c)(1),
(2) Date: Jun. 14, 2019

(87) PCT Pub. No.: WO2018/109710
PCT Pub. Date: Jun. 21, 2018

(65) Prior Publication Data
US 2019/0358640 A1    Nov. 28, 2019

(30) Foreign Application Priority Data

Dec. 16, 2016    (DK) .................................. 2016 70997

(51) Int. Cl.
*F16H 37/06*    (2006.01)
*B02C 17/24*    (2006.01)
(Continued)

(52) U.S. Cl.
CPC ............. *B02C 17/24* (2013.01); *F16H 57/02* (2013.01); *F16C 2361/61* (2013.01);
(Continued)

(58) Field of Classification Search
CPC . B02C 17/24; F16H 1/22; F16H 1/206; F16H 1/26
See application file for complete search history.

(56) References Cited

U.S. PATENT DOCUMENTS

| 3,844,184 A | 10/1974 | Nelson et al. |
| 2008/0034904 A1* | 2/2008 | Baker ..................... B02C 17/24 |
| | | 74/89.36 |

(Continued)

FOREIGN PATENT DOCUMENTS

BE    728970 A    8/1969

OTHER PUBLICATIONS

The International Search Report and Written Opinion dated Feb. 9, 2018, 8 pages.

*Primary Examiner* — Jake Cook
(74) *Attorney, Agent, or Firm* — Jeffrey A. Sharp

(57) ABSTRACT

Driving arrangement for a heavy-duty grinding mill (50) having a horizontal tube with a circumferential girth gear (51), comprising a driving assembly, comprising a motor (10); at least two engaging pinions (42, 44) configured to engage the girth gear (51) for driving the grinding mill (50); at least one gearbox (20) comprising an input shaft (22) for coupling the motor (10) with the at least one gearbox (20), at least two output shafts (31, 32) for coupling the gearbox (20) with the at least two engaging pinions (42, 44) and a torque split arrangement being configured to transmit torque of the input shaft (22) to the at least two output shafts (31, 32); and at least one frame (48) for supporting the at least two engaging pinions (42, 44) separate from the gearbox (20), and a heavy-duty grinding mill.

9 Claims, 2 Drawing Sheets

(51) Int. Cl.
  *F16H 57/02* (2012.01)
  *F16H 1/20* (2006.01)
  *F16H 1/22* (2006.01)
  *F16H 1/26* (2006.01)

(52) U.S. Cl.
  CPC ............... *F16H 1/206* (2013.01); *F16H 1/22* (2013.01); *F16H 1/26* (2013.01)

(56) References Cited

U.S. PATENT DOCUMENTS

2010/0314492 A1* 12/2010 Stamps .................... B64C 27/14
  244/60
2013/0008273 A1* 1/2013 Lessard ..................... F16H 1/22
  74/421 A
2013/0239723 A1 9/2013 Lessard \* cited by examiner

DRIVING ARRANGEMENT FOR A HEAVY-DUTY GRINDING MILL AND HEAVY-DUTY GRINDING MILL

FIELD OF THE INVENTION

The invention relates to a heavy-duty horizontal tube mill such as ball mill, autogenous grinding mill or semi autogenous grinding mill, which can be rotated by a mechanical gear drive system such as a girth gear being in mesh with at least one engaging pinion.

BACKGROUND OF THE INVENTION

Usually, an electric motor drives, directly or via a gearbox, a pinion meshing with the girth gear which is arranged and supported directly on the foundation as a single pinion drive with one pinion on one side of the mill. It may also be a dual-pinion drive with one pinion on each side of the mill. There are also other drive concepts used, like ring motor and side drives. For very large mills, only ring motors are used so far. With this conventional concept, mills with a power of 9 MW (for single-pinion drives) or up to 18 MW (for dual-pinion drives) can be driven. Mills comprising a total of four girth gear pinions may be driven with a power of up to 40 MW. However, all parts of the power train need to be in a size big enough to transmit the necessary power onto the girth gear.

US 2013/0239723 A1 discloses a mill comprising a gear ring suitable for being fastened to a grinding chamber, a first reduction transmission suitable for transmitting a rotation from a first motor to the gear ring, the reduction transmission comprises a case, an output module including an output pinion and an output shaft defining an output axis. The gear ring has helical teeth, the output pinions have helical teeth, and the output module can be inserted in a single piece into the associated case in an insertion direction or removed in a single piece from the associated case in a removal direction. The driving device comprises disconnectable connecting means suitable for rotatably connecting the output shaft to a transmission element and allowing in the disconnected state a rotation of the output pinion around the output axis upon removal of the output module outside the case or during insertion of the output module into the case.

An output module comprises a shaft, bearings, a speed reduction gearing, and a helical or spur output pinion. The output pinion meshes with the gear ring and each output module is enclosed in a case. The case is properly sealed and secured to the gear ring casing.

US 2013/0008273 A1 discloses a grinder that is provided with a drive device for a crown gear which comprises a reduction transmission which is provided with a drive shaft adapted so as to be connected to a motor, with at least one output pinion being adapted so as to mesh with the crown gear and to be driven by the drive shaft and with a casing.

The reduction transmission casing comprises shafts, bearings, a speed reduction gearing and spur output pinions. The spur output pinions mesh with the spur crown gear. The casing is properly sealed and secured to the crown gear casing.

"*Bradken's innovative single motor twin pinion [SMTP] grinding mill drive*" by Greg Evans and Eric Hofmann, SAG Conference in Vancouver, Canada, 2001 also discloses a gearbox device which connects a motor with the pinions meshing with the girth gear. The gearbox is separated from the pinions meshing with the girth gear so that a separated gearbox for the transmission pinions and the supporting cartridge for the pinions meshing with the gearbox are provided. The pinions meshing with the gearbox are supported by the cartridge. The pinion cartridge comprises shafts, low-speed bearings, and spur or helical pinions. The pinion bearings are mounted in an eccentric cartridge and the pinions mesh with the girth gear. The pinion cartridge is properly sealed and secured to the girth gear casing. However, this also makes it more difficult to manufacture the respective housing since the holes where the input shafts are entering the cartridge and where the supporting bearing is arranged need to be manufactured very accurately. There are some solutions to these problems like excentric bearing sleeves which can be correspondingly rotated until the bearing is in the correct position. However, as more elements are to be manufactured, cost of the resulting driving arrangement increase.

"*Quadrex®: A mechanical drive train solution for high-powered grinding mills*" by Fabrice Lessard, et al., SAG Conference in Vancouver, Canada, 2015 also shows a device with a gearbox including the pinions meshing with the girth gear. The Quadrex® is a modular unit and comprises shafts, bearings, speed reduction gearing, and helical or spur girth gear pinions. The girth gear pinions mesh with the girth gear. The Quadrex® is properly sealed and secured to the girth gear casing.

The aforementioned solutions provide a possibility to manufacture the single elements in a smaller size and, thus, are easier to mount. Furthermore, the power for driving the horizontal grinding mills can be increased. The transmission pinions are, however, mounted together with the output pinions meshing with the girth gear in a common housing and are also supported by this housing. This housing is connected to the housing of the girth gear in which lubrication has to be provided to ensure smooth running and to avoid strong abrasion on the girth gear. The pinions driving the girth gear are mounted in housings, and the housings are directly secured to the girth gear housing. The SMTP housing contains the pinons driving the girth gear and the low-speed bearings supporting the pinions driving the girth gear. In US 2013/0239723 A1, US 2013/0008273 A1 and the Quadrex®, the housing comprises shafts, high-speed bearings, low-speed bearings, speed reduction gearing and the pinions driving the girth gear.

In a mining environment is not practical to adequately seal the girth gear or the housing. Therefore, the girth gear and the housing are contaminated with slurry or other environmental contaminants. The girth gear are designed and manufactured to accept some environmental contaminants. However, the contaminants will diminish the life expectancy of the bearings and/or speed reduction gearing.

Owing to the low operating speeds of girth gears, it is not possible to develop a hydrodynamic lubrication film. It is for this reason that girth gears require tenacious high viscosity lubricants. These types of lubricants are not adequate to lubricated low or high-speed bearings or speed reduction gearing and, thus, have a negative impact on the life expectancy of each of these components.

However, the housing of the transmission pinions needs to be specifically adjusted for supporting all the pinions. For this, the relations of the different bearings within the housing have to be adjusted to each other very accurately owing to the engagement of the pinions meshing with the girth gear.

DISCLOSURE OF INVENTION

An object of the present invention is to provide a driving arrangement which is, on the one hand, capable of reliably driving big, heavy-duty grinding mills, and, on the other hand, easy to manufacture and install. Such a driving arrangement comprises the features of claim 1. The driving arrangement may protect the shafts, low-speed bearings, high-speed bearings and speed reduction gearing from contaminants and/or may provide suitable lubrication. The driving arrangement may further allow protection of the girth gear from dirt and abrasion by the girth gear guard. Further, preferred embodiments are described in the dependent claims.

A driving arrangement for a heavy-duty grinding mill having a horizontal tube with a circumferential girth gear according to the present invention comprises a driving assembly comprising a motor, such as an electric motor, at least two engaging pinions configured to engage the girth gear for driving the horizontal tube and at least one gearbox comprising an input shaft for coupling the motor with the at least one gearbox, at least two output shafts for coupling the gearbox with the at least two engaging pinions and a torque split arrangement being configured to transmit torque of the input shaft to the at least two output shafts; and at least one frame for supporting the at least two engaging pinions separate from the gearbox. In this way, it is easy to support the engaging pinions on the frame, without having to be highly accurate on the housing of the engaging pinions. The at least one frame, supporting the pinion, has to be made sufficiently rigid and resistant, as it transfers significant load into the foundation. Moreover, the housing can be made weaker, since it does not have to carry any weight of the engaging pinions. The housing may be a girth gear guard covering it. One pinion may be supported by the at least one frame whereas the other pinion may be supported on the foundation, or both pinions may be supported on the foundation.

Preferably, the torque split arrangement comprises a torque split shaft on which are arranged a torque split input pinion directly engaging with an input pinion on the input shaft and two torque split output pinions directly engaging with an output pinion on each of the at least two output shafts, respectively.

The torque split output pinions are preferably arranged on opposite sides of the torque split input pinion, along the torque split shaft. This arrangement enables a very balanced engagement of the torque split pinions with the pinions on the output shaft.

The torque split output pinions preferably comprise helical gears, in particular in opposite orientations to each other. This allows self-balancing of the torque split shaft since the oppositely oriented helical gears will always realign the torque split shaft. This allows a free floating shaft support. Thus, the torque split shaft is preferably free floating. Such a support is easy to mount and to manufacture.

The frame comprises at least two platforms arranged parallel to each other, each of the at least two platforms supports one of the at least two engaging pinions. Such a step-like arrangement of the platforms enables an easy arrangement of the pinions in view of the girth gear without a complicated mounting operation, and a big and solid housing.

Another aspect of the invention is a heavy-duty grinding mill comprising a horizontal tube with a circumferential girth gear, comprising two driving arrangements as described above, wherein the two driving arrangements are located on opposite sides of the grinding mill.

Preferably, these two driving arrangements on the opposite sides of the grinding mill can also further be located in opposite directions with regard to the axial ends of the grinding mill, for example a feed end and a discharge end. In such a construction, the engaging pinions are not interfering with each other and the motors are also greatly spaced apart of each other. Thus, during the construction and deconstruction of the driving arrangements, the workers and the respective machines will have enough space to mount all elements.

Further features of the invention, which are interesting in a technical and/or commercial way:

1. With the invention, it is possible to drive very large mills of up to 36 MW by mechanical means, which was so far only possible with a ring motor or wrap-around motor. Omission of the ring motor results in significantly lower costs.
2. With the invention, it is possible to drive mills of up to around 18 MW by mechanical means from only one side, which was so far done from both sides of the mill, with either open dual pinion drives or reducers with torque split directly meshing with the girth gear. This results in significantly lower costs for civil engineering and footprint.
3. The invention allows the use of either spur or helical pinion-girth-gear tooth design. Thus, it allows taking advantage of higher power transmissibility for helical tooth design.
4. The invention provides a clear separation of the speed reducing and torque split device from the pinions which mesh with the girth gear, which avoids the contamination of the gear-box internals owing to dust intake through the seal of the girth gear guard. This results in a clean and sealed lubrication system of this device, eliminates impact of misalignment and premature wear of the internals and, therefore, avoids heavy vibration, early failures, expensive replacements and low availability.
5. The invention is based on a stiff, simple and flat fixation of the pinions in mesh with the girth gear, either directly on the foundation or by means of a stiff and simple frame. This avoids problems resulting from vibration, stresses and low stiffness in a casing or the foundation fixation, especially in the dual arrangement, where the drive system uses both mill sides for larger powers.
6. The invention uses well-known and proven components. Thus, it does not bear any new or uncontrollable risk.

DESCRIPTION OF PREFERRED EMBODIMENTS

In the following, the terms "axial", "radial" and "circumferential" are used. "Axial" refers to a direction along the longitudinal axis of an element, e.g. a shaft, "radial" is a direction perpendicular to the axial direction, and "circumferential" is a direction around the axial direction.

Figure 1:
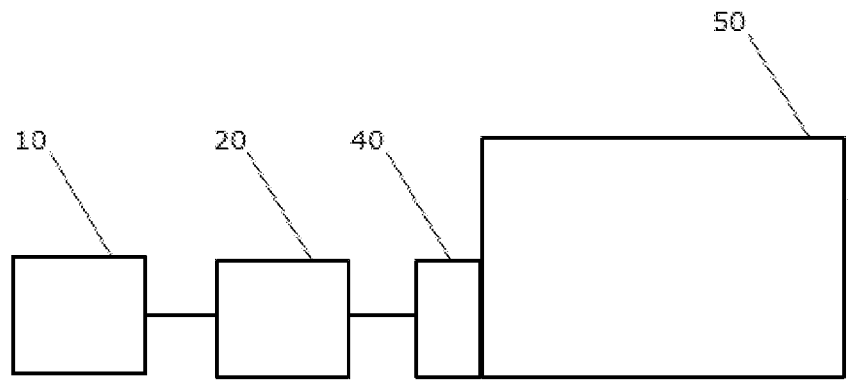
FIG. 1 shows a general schematic diagram of the driving arrangement according to the present invention.

FIG. 1 shows a general schematic diagram of the driving arrangement according to the present invention. A motor, or an engine, 10 generates power for driving the grinding mill 50. The torque from the motor 10 is transmitted to a gearbox 20 which splits the torque and transmits it to the engaging assembly 40. The engaging assembly 40 then directly drives the grinding mill 50.

The motor 10 may be an electric motor. It may be configured to generate at least a power of 9 to 20 MW.

The engaging assembly 40 comprises at least two engaging pinions 42, 44 for driving the horizontal grinding mill 50 via the two engaging pinions 42, 44 which are meshing with the girth gear 51 that is fixed circumferentially around the mill 50. The at least two engaging pinions 42, 44 are supported by a frame 48 which can be installed on the ground next to the mill 50 in the region of the girth gear 51. Preferably, the frame 48 is an open frame and comprises several beams and, furthermore, at least two platforms, one for each of the at least two engaging pinions 42 and 44. On each of the at least two platforms, a support 41 and 43 is mounted, in which the engaging pinions 42 and 44 are held in position. The girth gear 51 of the mill 50 comprises a girth gear guard (not shown) which covers the girth gear 51 in a circumferential direction of the mill 50. This protects the girth gear 51 from dirt and keeps the lubricant on the girth gear 51. The at least two engaging pinions 42 and 44 are also covered by the girth gear guard by means of a protrusion that covers and accommodates the at least two engaging pinions 42, 44. The supports 41, 43 for the at least two engaging pinions 42, 44 do not need to be covered, but they may be. However, the protrusion is not necessarily supported by the frame 48. The girth gear guard may be supported by a separate support on the ground.

The gearbox 20 comprises a plurality of pinions and a plurality of shafts for transmitting the torque from the motor 10 to the at least two engaging pinions 42, 44. The gearbox 20 comprises an outer housing 38 covering the plurality of pinions and the plurality of shafts.

Figure 2:
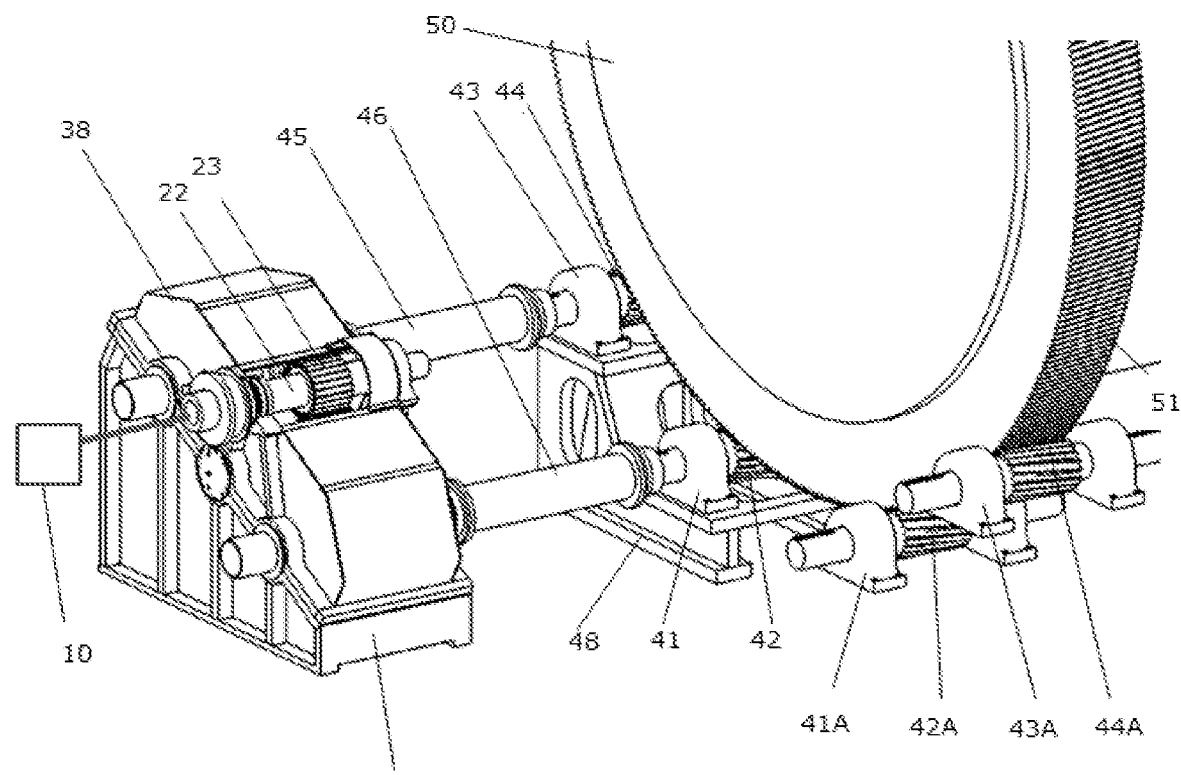
FIG. 2 is an isometric view on the gearbox, the engaging pinions and the girth gear.
Figure 3:
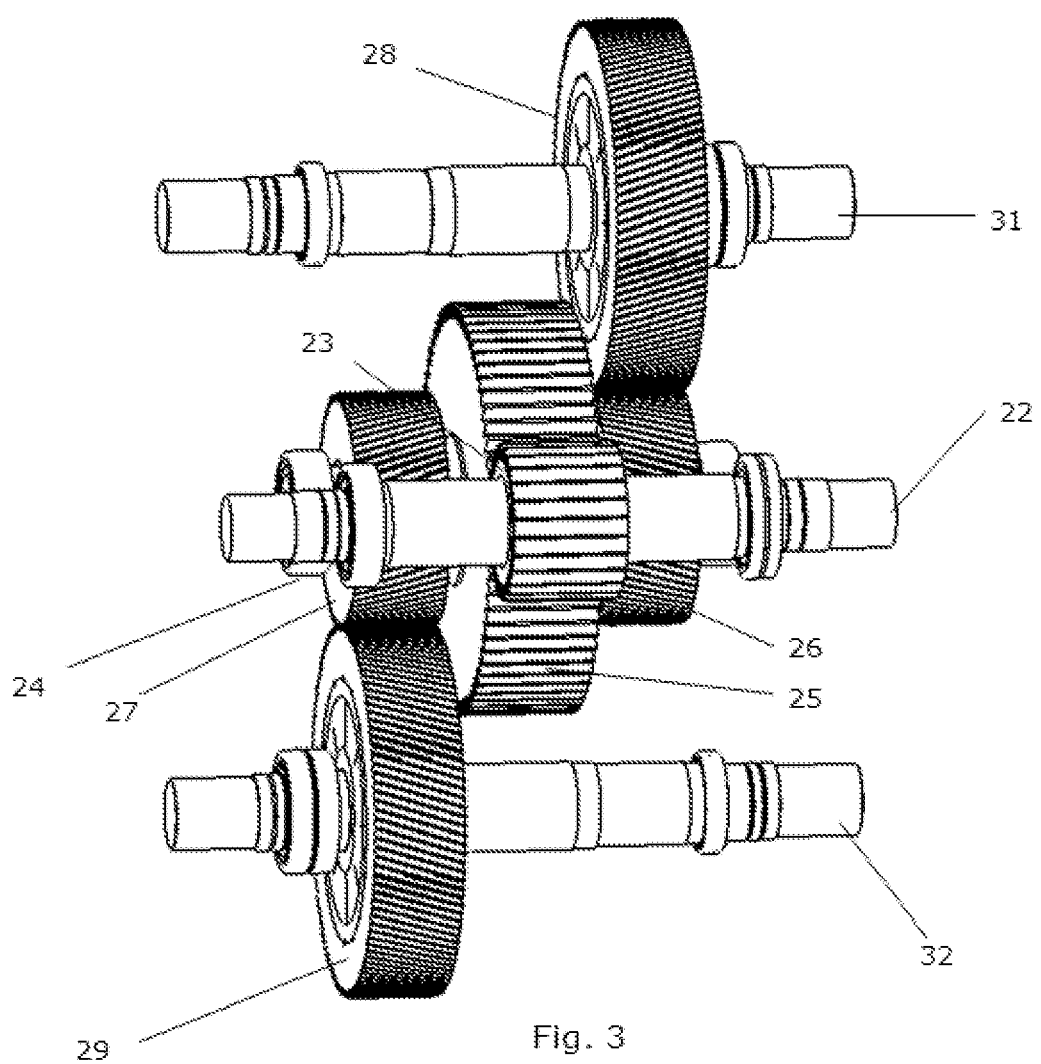
FIG. 3 is an isometric view on the pinions and shaft of the gearbox with the housing removed.

With reference to FIG. 2, the gearbox 20 comprises an input shaft 22 and an input pinion 23. The input pinion 23 transmits the torque to a torque split input pinion 25 that is directly engaging with the input pinion 23. At opposite sides of the torque split input pinion 25 are arranged two torque split output pinions 26, 27 which mesh with the output pinions 28, 29. The output pinions 28, 29 and the torque split output pinions 26, 27 preferably comprise helical tooth gears so that engagement of these pinions 26, 27, 28, 29 is very smooth. The helical gear of the first torque split output pinion 26 and the second torque split output pinion 27 are formed opposite to each other, so as to force the torque split shaft 24 in different directions, that is axial forces from the two helices compensate each other. In particular, with this arrangement, the torque split shaft 24 can be supported axially free floating. Thus, the torque split shaft 24 must only be supported in its radial direction. The output shafts 31, 32, on which the output pinions 28, 29 are mounted, are then connected to the at least two engaging pinions 42, 44, respectively. As can be seen in FIG. 2, the output shafts 31, 32 can be connected to the at least two engaging pinions 42, 44 via output couplings 45, 46 that prevent transmitting jerky transmission from the at least two engaging pinions 42, 44 meshing with the girth gear 51 on the mill 50. This prevents damage of the motor 10 and/or the gearbox owing to sudden rotational impacts.

As shown is FIG. 2, the driving arrangement according to the present invention may be arranged at both sides of the mill 50. Then the driving power can be increased and bigger mills can be driven. Preferably, these driving arrangements may be disposed on both sides of the mill and also on opposite sides with regard to the longitudinal axis of the tube 50. In FIG. 2, the engaging pinions 42A, 44A and the respective support 41A, 43A can be seen. The second driving arrangement is built like the first one, and arranged just on the other side of the tube 50.

Figure 4:
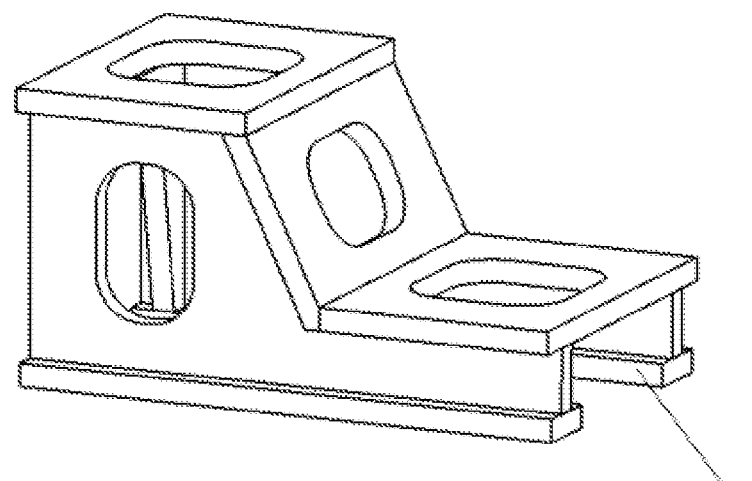
FIG. 4 is an isometric view on the frame for supporting the engaging pinions.

FIG. 4 is an isometric view on the frame 48 for supporting the engaging pinions 42, 42A, 44, 44A. The frame 48 comprises at least two platforms. The at least two platforms may arranged step-like, e.g. parallel to each other. Each of the at least two platforms supports one of the at least two engaging pinions 42, 44 or 42A, 44A. The frame 48 may be an open frame. It may be made from metal, such as steel. It may comprise a plurality of beams.

Alternatively, only one of the at least two engaging pinions may be supported by the frame and the other of the at least two engaging pinions may be supported directly on the foundation, or both pinions may be supported directly on the foundation.

LIST OF REFERENCE SIGNS motor 10
gearbox 20
input shaft 22
input pinion 23
torque split shaft 24
torque split input pinion 25
torque split output pinion 26, 27
output pinion 28, 29
output shaft 31, 32
outer housing 38
engaging assembly 40
support 41, 41A, 43, 43A
engaging pinion 42, 42A, 44, 44A
output coupling 45, 46
frame 48
grinding mill 50
girth gear 51

The invention claimed is:

1. Driving arrangement for a heavy-duty grinding mill (50) having a horizontal tube with a circumferential girth gear (51), comprising:
   a driving assembly, comprising:
      a motor (10);
      at least two engaging pinions (42, 44) configured to engage the girth gear (51) for driving the grinding mill (50);
      at least one gearbox (20) comprising an input shaft (22) for coupling the motor (10) with the at least one gearbox (20), at least two output shafts (31, 32) for coupling the gearbox (20) with the at least two engaging pinions (42, 44) and a torque split arrangement being configured to transmit torque of the input shaft (22) to the at least two output shafts (31, 32); and
   at least one frame (48) for supporting the at least two engaging pinions (42, 44) separate from the gearbox (20),
   wherein the torque split arrangement comprises a torque split shaft (24) on which are arranged a torque split input pinion (25) directly engaging with an input pinion (23) on the input shaft (22) and two torque split output pinions (26, 27) directly engaging with an output pinion (28, 29) on each of the at least two output shafts (31, 32), respectively.

2. Driving arrangement of claim 1, wherein the torque split output pinions (26, 27) are arranged on opposite sides of the torque split input pinion (25).

3. Driving arrangement of claim 1, wherein the torque split output pinions (26, 27) comprise helical gears in opposite orientation to each other.

4. Driving arrangement of claim 3, wherein the torque split shaft (24) is supported axially free floating.

5. Driving arrangement of claim 1, wherein the frame (48) comprises at least two platforms arranged parallel to each other, and each of the at least two platforms supports one of the at least two engaging pinions (42, 44).

6. Heavy duty grinding mill comprising a horizontal tube with a circumferential girth gear (51), comprising two driving arrangements according to claim 1, wherein the two driving arrangements are located on opposite sides of the grinding mill.

7. Heavy duty grinding mill of claim 6, wherein the two driving arrangements are further located in opposite directions with regard to the axial ends of the grinding mill.

8. Driving arrangement of claim 2, wherein the torque split output pinions (26, 27) comprise helical gears in opposite orientation to each other.

9. Driving arrangement of claim 8, wherein the torque split shaft (24) is supported axially free floating.

\* \* \* \* \*